3,336,350
ESTERS OF 3,3',5,5'-TETRAMETHYL-2,4,4'-BIPHENYL-TRIOL
Daniel W. Fox, Pittsfield, Mass., assignor to General Electric Company, a corporation of New York
No Drawing. Filed Oct. 21, 1965, Ser. No. 500,217
4 Claims. (Cl. 260—410.5)

ABSTRACT OF THE DISCLOSURE

Functional fluids that are triesters of tetramethyl trihydroxybiphenyl.

---

This invention relates to novel functional fluid compositions. More particularly, this invention relates to functional fluid compositions consisting of triesters of substituted trihydroxy biphenyls and mixtures of triesters of substituted trihydroxy biphenyls with other functional fluids.

During the past few years, there has been a rapid growth in the use of functional fluids as a substitute for natural hydrocarbon substances such as mineral oil. This growth has been due in part to the unique chemical and physical properties required for many specialty purposes that are unobtainable with the hydrocarbons. Typical uses of functional fluids include lubricants, power transmission media, hydraulic fluids, heat transfer baths, plasticizers for polymers, etc. Functional fluids that have been employed for such purposes include phosphate esters, silicate esters, polyglycols, silicone fluids, diester fluids, low molecular weight asymmetric polyphenyl ethers, etc. For many applications, the above-noted functional fluids require additives to inhibit oxidation, to improve lubricity, to decrease volatility, to inhibit rust formation in the presence of metallic surfaces, and to increase hydrolytic stability.

I have found that the triesters of substituted biphenyls may be used as functional fluids for many of the applications noted above and in addition, may be used as additives with other functional fluids to improve lubricity and hydrolytic stability and decrease volatility.

Accordingly, the object of this invention is to provide a triester of a substituted trihydroxy biphenyl that has utility as a functional fluid or as an additive for other functional fluids to improve lubricity and hydrolytic stability and to decrease volatility.

The triesters of this invention may be represented by the following general formula:

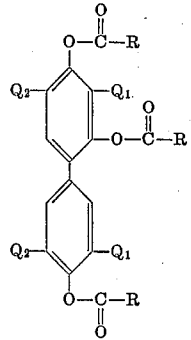

wherein $Q_1$ and $Q_2$ are monovalent hydrocarbons having from 1 to 15 carbon atoms such as alkyl, including cycloalkyl, e.g., methyl, ethyl, propyl, isopropyl, butyl, secondary butyl, tertiary butyl, isobutyl, cyclobutyl, amyl, cyclopentyl, hexyl, cyclohexyl, methylcyclohexyl, ethylcyclohexyl, octyl, decyl, etc.; aryl, including alkaryl, e.g., phenyl, tolyl, ethylphenyl, xylyl, naphthyl, methylnaphthyl, etc.; aralkyl, e.g., benzyl, phenylethyl, phenylpropyl, tolylethyl, etc.; and R is a monovalent hydrocarbon having from 4 to 30 carbon atoms. Typical examples of what R may represent are alkyl including cycloalkyl, e.g., butyl, isobutyl, cyclobutyl, amyl, cyclopentyl, hexyl, cyclohexyl, methylcyclohexyl, ethylcyclohexyl, octyl, decyl, octadecyl, nonadecyl, pentacosanyl, 2,4-dimethylcyclohexyl, etc.; alkenyl including cycloalkenyl, e.g., butenyl, cyclobutenyl, isopentenyl, cyclopentenyl, linolyl, undecenyl, etc.; alkynyl, e.g., butynyl, pentynyl, heptynyl, etc.; aryl including alkaryl, e.g., phenyl, tolyl, ethylphenyl, xylyl, naphthyl, methylnaphthyl, etc.; aralkyl, e.g., benzyl, phenylethyl, phenylpropyl, tolylethyl, etc.

There are various methods for forming the triesters of this invention. One method comprises reacting an acid anhydride with tetra substituted diphenoquinone. The diphenoquinone can be formed by an oxidative coupling reaction involving a phenol and a copper amine complex catalyst in the manner disclosed and claimed in copending U.S. patent application Ser. No. 212,127, now United States Patents 3,306,874, and 212,128, now United States Patent 3,506,875, of Allan S. Hay filed concurrently July 24, 1962, and incorporated herein by reference. The reaction of the diphenoquinone with the anhydride may be represented as follows:

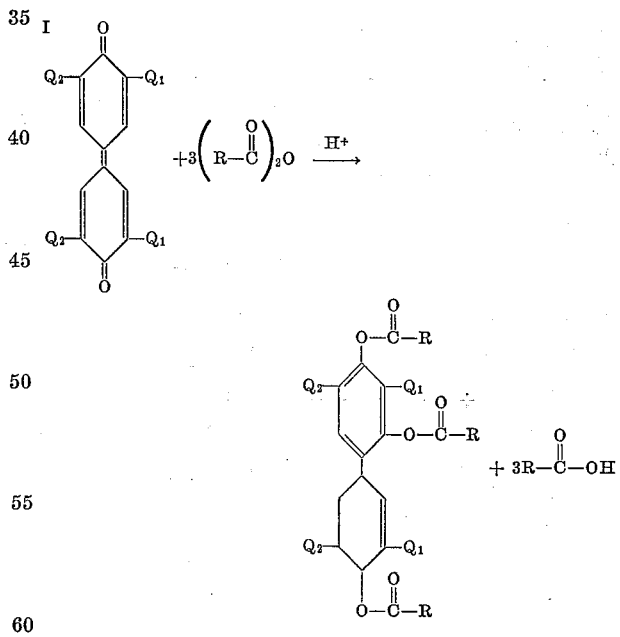

wherein R, $Q_1$ and $Q_2$ are the same as described above. The reaction is carried out at elevated temperatures in the presence of a strong acid catalyst. Typical catalysts include sulfuric acid, hydrochloric acid, toluene sulfonic acid, boron fluoride-ether complexes, perchloric acid, etc.

Another method for preparing the triesters involves the reaction of an acid anhydride with a tetra substituted trihydroxy biphenyl. The preparation of the trihydroxy biphenyls is disclosed in copending U.S. Patent application Ser. No. 436,958 of Seymour Schmukler filed Mar. 3, 1965, incorporated herein by reference. The reaction of the acid anhydride with the trihydroxy biphenyl can be represented by the following equation:

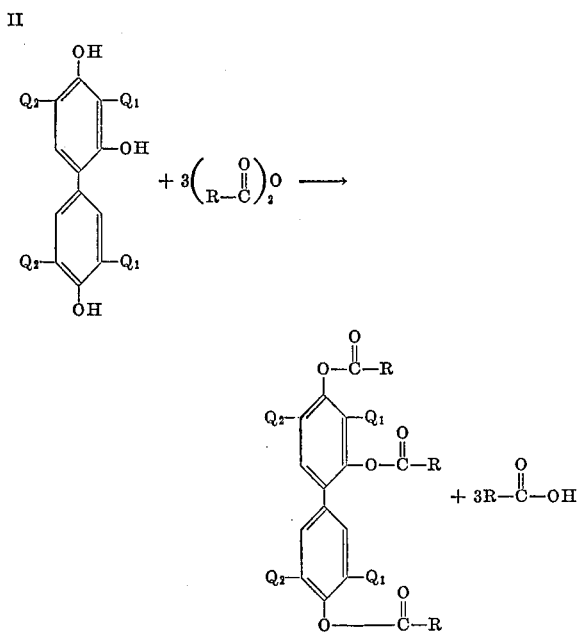

wherein R, $Q_1$ and $Q_2$ have the meaning noted above. Again, this reaction should be carried out in the presence of a strong acid at elevated temperatures. Esterification of phenolic hydroxyls with reactive anhydrides is described in U.S. Patent No. 2,212,509 of Oscar A. Cherry.

An additional method for forming triesters from trihydroxy biphenyls involves the reaction of the trihydroxy with an acid halide according to the following equation:

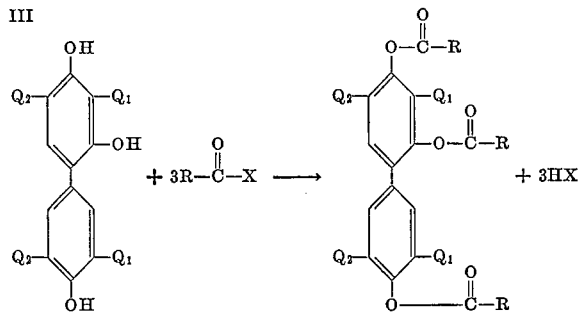

wherein R, $Q_1$ and $Q_2$ have the meaning noted above and X is a halide, e.g., fluorine, chlorine, bromine, iodine. A caustic material should be present in the reaction mixture to neutralize the acid as it is formed.

The triesters may also be formed by an ester exchange reaction between an acylated biphenyl compound and a carboxylic acid. This reaction proceeds in the following manner:

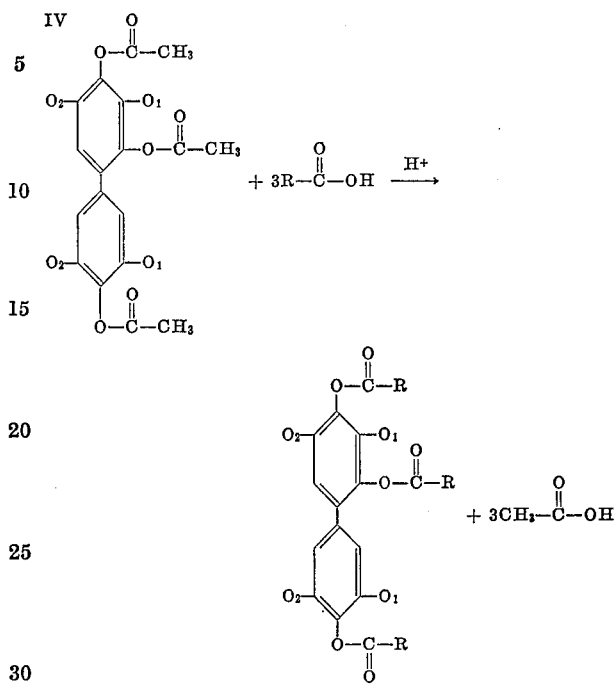

wherein R, $Q_1$ and $Q_2$ have the meaning noted above. The reaction should be carried out in the presence of a strong acid at elevated temperatures. The acetic acid must be removed as it is formed to force the reaction to completion. Reactions of a similar nature are disclosed in U.S. Patent 2,331,169 of Bruson.

The triesters of trihydroxy biphenyls are relatively non-volatile, pale yellow liquids having excellent hydrolytic stability and lubricity. They are compatible with a large number of other functional fluids and contribute to reduced volatility, increased lubricity and improved hydrolytic stability when used in combination with other functional fluids. The quantity of triester that may be mixed with other functional fluids depends upon the compatibility of the triester and the other functional fluid. For example, with diester functional fluids, the triesters are compatible over the entire concentration range. The same is true with the methylphenyl silicones. In addition, the triesters are excellent plasticizers for many polymeric compositions.

The invention will be further illustrated in greater detail by the following specific examples. It should be understood, however, that although these examples may describe in particular detail some of the more specific features of the invention, they are given primarily for the purpose of illustration and the invention in its broader aspects is not to be construed as limited thereto. All percentages noted in the examples are by weight unless indicated otherwise.

*Example 1*

In this example, a triester was formed by reacting 38.4 g. (0.1 mole) of 2,4,4'-triacetoxy-3,3',5,5'-tetramethylbiphenyl with 129.6 g. (0.9 mole) of caprylic acid. The mixture of triacetate and caprylic acid was heated under a nitrogen blanket at a temperature of approximately 244° C. for a period of one hour. The temperature was then elevated slightly and heating was continued for an additional 9½ hours. The temperature fluctuated between about 245 and 270° C. during this period. The mixture was allowed to cool and then subjected to distillation to remove acetic acid. Distillation was first conducted at atmospheric pressure up to a temperature of 245° C. and then at 20 mm. to a temperature of 125° C. The residue was 79.4 g. This residue was then further distilled up to a pot temperature of 250° C. at 0.25 mm. leaving 38.5 g. of an amber oil. This oil was treated with fuller's earth and passed through a column containing alumina and charcoal to improve its color. The oil was identified as the tricaprylate of 3,3′,5,5′-tetramethyl-2,4,4′-trihydroxybiphenyl.

Example 2

In this example, 20 g. of 3,3′,5,5′-tetramethyl-2,4,4′-triacetoxybiphenyl were mixed with 88 g. of 2-ethylhexanoic acid. The reaction mixture was refluxed under a nitrogen blanket at a temperature of approximately 233° C. for a total of 46 hours. During the course of the reaction, samples of distillate were removed from the reflux condenser and identified as acetic acid. The liberation of acetic acid indicates triester formation. Following the reaction period, a vaccum strip was performed on the residue remaining in the reaction vessel. Acetic acid and excess ethylhexanoic acid were removed. Following the vacuum strip, 30.52 g. of a pale yellow liquid residue were left in the reaction vessel. This was identified as the triethylhexanoate of 3,3′,5,5′-tetramethyl-2,4,4′-trihydroxybiphenyl.

Example 3

In this example, the procedure of Example 2 was repeated but 5 drops of boron fluoride ethyl ether complex were added as a catalyst. The reaction was allowed to proceed for a total of 22 hours. The residue after vacuum stripping amounted to 20.82 g. and was identified as the triethylhexanoate of 3,3′,5,5′-tetramethyl-2,4,4′-trihydroxybiphenyl.

Example 4

The procedure of Example 2 was repeated but 1½ g. of toluene sulfonic acid were used as the catalyst. The reaction mixture of 20 g. of 3,3′,5,5′-tetramethyl-2,4,4′-triacetoxybiphenyl and 88 g. of 2-ethylhexanoic acid was refluxed at a temperature of approximately 200° C. for approximately 1 hour and 55 minutes. The residue was vacuum stripped and 22 g. of 2-triethylhexanoate of 3,3′,5,5′-tetramethyl-2,4,4′-trihydroxybiphenyl remained in the reaction vessel. This example indicates the effectiveness of the toluene sulfonic acid as a catalyst in this type of reaction.

Example 5

A mixture was prepared consisting of 200 g. of 3,3′,5,5′-tetramethyl-2,4,4′-triacetoxybiphenyl, 880 g. of 2-ethylhexanoic acid and 15 g. of toluene sulfonic acid. This mixture was placed in a reaction vessel equipped with a distillation column. The vessel was blanketed with nitrogen and heated to 195° C. Acetic acid was continuously removed during the course of the reaction. After 35 cc. of acetic acid were collected, the reaction was stopped and the residue washed twice with water. Benzene was added to the oily residue. The mixture was filtered through charcoal and then through florisil. Thereafter, the mixture was vacuum stripped to remove benzene and acids remaining in the triester. Toluene was added to the residue and the mixture passed through charcoal and fuller's earth. The toluene was then removed by vacuum stripping. The yield was 203 g. of a triethylhexanoate of 3,3′,5,5′-tetramethyl-2,4,4′-trihydroxybiphenyl.

Example 6

A mixture was prepared by adding 880 g. of caprylic acid, 200 g. of 3,3′,5,5′-tetramethyl-2,4,4′-triacetoxybiphenyl and 15 g. of toluene sulfonic acid to a reaction vessel equipped with a distillation column. This mixture was heated to 240° C. under nitrogen and the reaction allowed to proceed until acetic acid was no longer evolved. The residue was washed twice with water. Benzene was added and the mixture was filtered through charcoal and then through florisil. Benzene was distilled off. The residue was still dark in color. Toluene was added and the mixture filtered. The mixture was vacuum stripped to remove toluene. The residue was a pale yellow oil weighing 203 grams. This was identified as the tricaprylate of 3,3′,5,5′-tetramethyl-2,4,4′-trihydroxybiphenyl.

Example 7

A mixture consisting of 33.8 g. of 3,3′,5,5′-tetramethyl-2,4,4′-trihydroxybiphenyl and 147 cc. pyridine was cooled to 17° C. Thereafter, 39.8 g. of 2-ethylhexanoyl chloride were added dropwise. This caused the temperature to climb to 25° C. The reaction vessel was then heated to reflux and the reflux temperature maintained for 3 hours. The mixture was cooled and poured into ice water. Thereafter, it was first washed with acidified water and then with a 10 percent sodium carbonate solution. The mixture was vacuum stripped and a pale yellow liquid identified as the triethylhexanoate of 3,3′,5,5′-tetramethyl-2,4,4′-trihydroxybiphenyl was obtained.

Example 8

In this example, a reaction mixture was formed consisting of 24.2 g. of 3,3′,5,5′-tetramethyl-2,4,4′-trihydroxybiphenyl, 125 cc. pyridine and 32.4 g. of 2-ethylhexanoyl chloride. The chloride was added to the reaction mixture slowly and thereafter, the temperature was brought to reflux (100° C.) and maintained at that temperature for approximately 2½ hours. Following reflux, the mixture was cooled and poured into ice water. Chloroform was added to effect separation and the organic layer was washed with acidified water. Thereafter, the organic layer was washed with a 10 percent sodium carbonate solution. Chloroform was evaporated and the residue was vacuum stripped. The product resulting from the vacuum stripping operation was purified by molecular distillation through a Hickman still. It was identified as the triethylhexanoate of 3,3′,5,5′-tetramethyl-2,4,4′-trihydroxybiphenyl.

Example 9

In this example, 40 g. of 3,3′,5,5′-tetramethyl-2,4,4′-triacetoxybiphenyl, 176 g. of neo-heptanoic acid and 3 g. of toluene sulfonic acid were added to a reaction vessel equipped with a distillation column. The mixture was heated under a nitrogen blanket at 205° C. until 17 ml. of acetic acid were collected. The product was water washed and toluene added. The solution was filtered through fuller's earth and charcoal. Thereafter, it was vacuum stripped and purified by molecular distillation in a Hickman still. The product was a pale yellow liquid identified as the trineo-heptanoate of 3,3′,5,5′-tetramethyl-2,4,4′-trihydroxybiphenyl.

Example 10

A flask was filled with 1740 g. of stearic acid, 200 g. of 3,3′,5,5′-tetramethyl-2,4,4′-triacetoxybiphenyl and 15 g. of toluene sulfonic acid. The mixture was heated to reflux (220° C.) under a nitrogen blanket to effect removal of acetic acid. Thereafter, the material was treated with sodium carbonate, filtered, water washed and vacuum stripped.

Example 11

One important property of a functional fluid is its low volatility. A tri-2-ethylhexanoate and a trineo-heptanoate of 3,3′,5,5′ - tetramethyl - 2,4,4′-trihydroxybiphenyl were compared for relative volatilities. Two grams of each of the materials were placed in a beaker and heated at 250° C. and checked periodically for weight loss. After 63 hours of heating, the trineo-heptanoate sample lost 24 percent of its original weight and the tri-2-ethylhexanoate sample lost 29 percent.

Example 12

A 50-50 mixture of tri-2-ethylhexanoate of a 3,3′,5,5′-tetramethyl-2,4,4′-trihydroxybiphenyl and a methyl phenyl silicone oil was prepared and tested for volatility. A sample of a commercial diester fluid identified as Emery 3383–D was tested in the same manner for purposes of comparison. After heating for 120 hours at 250° C., the triester-silicone sample had lost approximately 44 percent of its total weight while the Emery sample lost over 73 percent of its total weight.

*Example 13*

This sample illustrates the effectiveness of the triesters of this invention as additives for improving the lubricity properties of other functional fluids. Samples were prepared consisting of a methyl phenyl silicone oil and a tri-2-ethylhexanoate of a 3,3′,5,5′-tetramethyl-2,4,4′-trihydroxybiphenyl. The mixtures were subjected to a Shell four-ball wear scar test. Spindle speed was 600 r.p.m. and the load was 50 kg. The test was run at room temperature and a ball having a size of .52/.52 was used. The following results were obtained:

TABLE I.—LUBRICITY TEST FOR TRIESTER-SILICONE MIXTURES

| Composition (Wt. Percent) | | Wear Scar Diameter (mm.) |
|---|---|---|
| Silicone | Triester | |
| 100 | 0 | >3.50 |
| 80 | 20 | 3.20 |
| 50 | 50 | 0.61 |
| 20 | 80 | 0.56 |
| 0 | 100 | 0.70 |

A value of 0.50 to 0.70 constitutes an acceptable value. The smaller the wear scar, the better the lubricity of the compound being tested. From the above, it is apparent that addition of triester substantially reduces the wear scar diameter of the silicone oil. Mixtures of 50 percent silicone oil and 50 percent triester allow for a wear scar diameter of only 0.61 mm. as compared with greater than 3.5 mm. for the wear scar diameter of the pure silicone oil.

*Example 14*

To determine the effectiveness of the triester of this invention as a plasticizer, film was prepared consisting of 60 weight percent polyvinyl chloride and 40 weight percent of a tri-2-ethylhexanoate of a 3,3′,5,5′-tetramethyl-2,4,4′-trihydroxybiphenyl. The materials were milled together at approximately 150° C. and molded at 170° C. for approximately 1 minute. A clear flexible film was obtained. This film was found to be more flexible and softer than non-plasticized polyvinyl chloride film.

In addition to polyvinyl chloride, the triesters of this invention may be used in combination with many other polymeric materials as they have been found to be compatible with a wide variety of polymers. Such polymers compatible with the triesters of this invention include, but are not limited to, butvars, polyamides, styrene-butadienes, polystyrenes, polyvinyl acetates, polycarbonates, polyphenylene oxides, polyethylenes, silicones, etc.

Although the invention has been illustrated by the preceding examples, the invention is not to be construed as limited to materials employed in the above exemplary examples, but rather, the invention encompasses the generic concept as hereinbefore disclosed. Various modifications in embodiments of this invention can be made without departing from the spirit and scope thereof.

What I claim as new and desire to secure by Letters Patent of the United States is:

1. A functional fluid having the formula

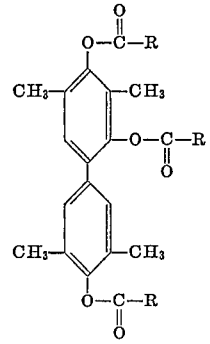

wherein R is alkyl having from 4 to 30 carbon atoms.

2. The functional fluid of claim 1 wherein R is 2-ethylhexyl.
3. The functional fluid of claim 1 wherein R is heptyl.
4. The functional fluid of claim 1 wherein R is octyl.

References Cited

UNITED STATES PATENTS 3,205,270   9/1965   Jaruzelski et al. _____ 260—613

OTHER REFERENCES

Erdtman: Chemical Abstracts, vol. 26 (1932), columns 4803–f04.

HENRY R. JILES, *Primary Examiner.*